(12) United States Patent
Jiwani

(10) Patent No.: US 11,915,250 B2
(45) Date of Patent: Feb. 27, 2024

(54) DETECTION OF AUTHENTICITY OF RIDE IN VEHICLE ALLOCATION

(71) Applicant: ANI TECHNOLOGIES PRIVATE LIMITED, Bengaluru (IN)

(72) Inventor: Moiaz Jiwani, Bilaspur (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 452 days.

(21) Appl. No.: 17/191,054

(22) Filed: Mar. 3, 2021

(65) Prior Publication Data
US 2021/0406919 A1 Dec. 30, 2021

(30) Foreign Application Priority Data
Jun. 29, 2020 (IN) .............................. 202041027545

(51) Int. Cl.
H04W 8/02 (2009.01)
H04W 4/029 (2018.01)
G06Q 30/018 (2023.01)

(52) U.S. Cl.
CPC ........ G06Q 30/0185 (2013.01); H04W 4/029 (2018.02); H04W 8/02 (2013.01)

(58) Field of Classification Search
CPC ................................ H04W 4/029; H04W 4/40
USPC ..................................... 455/3.06; 379/201.12
See application file for complete search history.

(56) References Cited

U.S. PATENT DOCUMENTS

| 8,391,775 | B2* | 3/2013 | Moinzadeh | G11B 27/105 |
| | | | | 455/3.06 |
| 8,600,391 | B2* | 12/2013 | Vendrow | H04M 3/42374 |
| | | | | 379/201.12 |
| 9,063,223 | B2 | 6/2015 | Lai | |
| 9,485,660 | B2 | 11/2016 | Cote | |
| 9,541,419 | B2* | 1/2017 | Borghesani | G07C 5/008 |
| 9,584,962 | B2 | 2/2017 | Demeter | |
| 10,467,896 | B2* | 11/2019 | Demisse | G06Q 10/02 |
| 10,470,154 | B2 | 11/2019 | Chellamani | |
| 10,529,048 | B2* | 1/2020 | Rajcok | H04W 4/40 |
| 10,679,313 | B2* | 6/2020 | Rajcok | H04W 4/40 |

(Continued)

FOREIGN PATENT DOCUMENTS

WO WO-2018211488 A1 * 11/2018 ........ B60W 60/0011

OTHER PUBLICATIONS

"On Recommending Opportunistic Rides", Nicola Bicocchi • Marco Mamei • Andrea Sassi • Franco Zambonelli. Published in: IEEE Transactions on Intelligent Transportation Systems (vol. 18, Issue: 12, pp. 3328-3338) Apr. 2017 (Year: 2017).*

*Primary Examiner* — William D Cumming
(74) *Attorney, Agent, or Firm* — CHIP LAW GROUP

(57) ABSTRACT

An authenticity detection method and system is provided for detecting an authenticity of a ride in a ride hailing environment. A set of geohashes is determined based on historical location data and a set of cell tower hashes is determined based on historical telecom data. A cellular network data corpus is generated based on the set of geohashes and the set of cell tower hashes. First location data and first telecom data are received from a driver device of a driver. A first geohash is determined based on the first location data and a first cell tower hash is determined based on the first telecom data. The authenticity of the ride is detected based on at least the cellular network data corpus, the first geohash, and the first cell tower hash.

20 Claims, 7 Drawing Sheets

(56) References Cited

U.S. PATENT DOCUMENTS

| | | | |
|---|---|---|---|
| 10,789,837 B2* | 9/2020 | Demisse | G06Q 30/0265 |
| 11,386,781 B1* | 7/2022 | Demisse | G06Q 30/0265 |
| 11,704,608 B2* | 7/2023 | Afzal | G06Q 50/30 |
| | | | 705/7.15 |
| 2008/0218409 A1* | 9/2008 | Moinzadeh | G11B 27/034 |
| | | | 381/86 |
| 2015/0268059 A1* | 9/2015 | Borghesani | G07C 5/008 |
| | | | 701/32.3 |
| 2019/0205812 A1* | 7/2019 | Afzal | G06Q 10/063114 |
| 2019/0228643 A1* | 7/2019 | Demisse | G06Q 30/0265 |
| 2019/0244318 A1* | 8/2019 | Rajcok | H04W 4/029 |
| 2019/0272483 A1* | 9/2019 | Hiray | G06Q 50/30 |
| 2019/0333180 A1* | 10/2019 | Rajcok | H04W 4/029 |
| 2019/0386505 A1* | 12/2019 | Lin | H04W 12/08 |
| 2020/0074849 A1* | 3/2020 | Demisse | G06Q 30/0267 |
| 2021/0114616 A1* | 4/2021 | Altman | G01C 21/3889 |
| 2021/0406919 A1* | 12/2021 | Jiwani | H04W 4/029 |

* cited by examiner

DETECTION OF AUTHENTICITY OF RIDE IN VEHICLE ALLOCATION

CROSS-RELATED APPLICATIONS

This application claims priority of Indian Non-Provisional Application No. 202041027545, filed Jun. 29, 2020, the contents of which are incorporated herein by reference.

FIELD

Various embodiments of the disclosure relate generally to authentication. More specifically, various embodiments of the disclosure relate to detection of an authenticity of a ride in vehicle allocation.

BACKGROUND

Generally, during the process of booking a vehicle for a ride, a passenger provides ride-related details, for example, a source location, a destination location, a time of travel, or the like, by using a ride-hailing application running on a mobile device of the passenger. Based on the ride-related details provided by the passenger, a transport aggregator assigns a transport provider to the passenger. The transport aggregator preferably selects the transport provider, such as an available vehicle and a corresponding driver, who is in vicinity of the source location provided by the passenger.

Generally, the vicinity of the transport provider to the source location is determined based on a Global Navigation Satellite System (GNSS) (for example, Global Positioning System (GPS)) information associated with the vehicle or the driver. The GPS information is generally obtained from a GPS application running on a vehicle device of the vehicle or a driver device of the driver. The GPS application operates in conjunction with one or more GPS sensors to obtain the GPS information of the vehicle or the driver. However, now-a-days, there are various fake GPS applications that may be used by various drivers to provide falsified location updates from vehicle devices or driver devices. Use of such fake GPS application by the driver may lead to false vehicle allocation to the driver who does not actually exist in the vicinity of the source location provided by the passenger. This technique may be used by the driver to increase the ride count to gamify incentives. Further, such allocation seriously hampers the passenger experience as a duration of wait time for the passenger may increase significantly. Further, if the drivers are able to redeem such unauthentic ride requests, the value of the services provided by the transport aggregator may diminish due to lack of confidence in the security of the ride requests initiated by various passengers. Further, hackers or competitors may employ such techniques to hinder the services of the transport aggregator.

In light of the foregoing, there exists a need for a technical and reliable solution that overcomes the above-mentioned problems, challenges, and short-comings, and continues to facilitate effective and efficient solutions for detecting genuineness or authenticity of one or more rides in a ridesharing platform.

SUMMARY

Detection of an authenticity of a ride in vehicle allocation is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
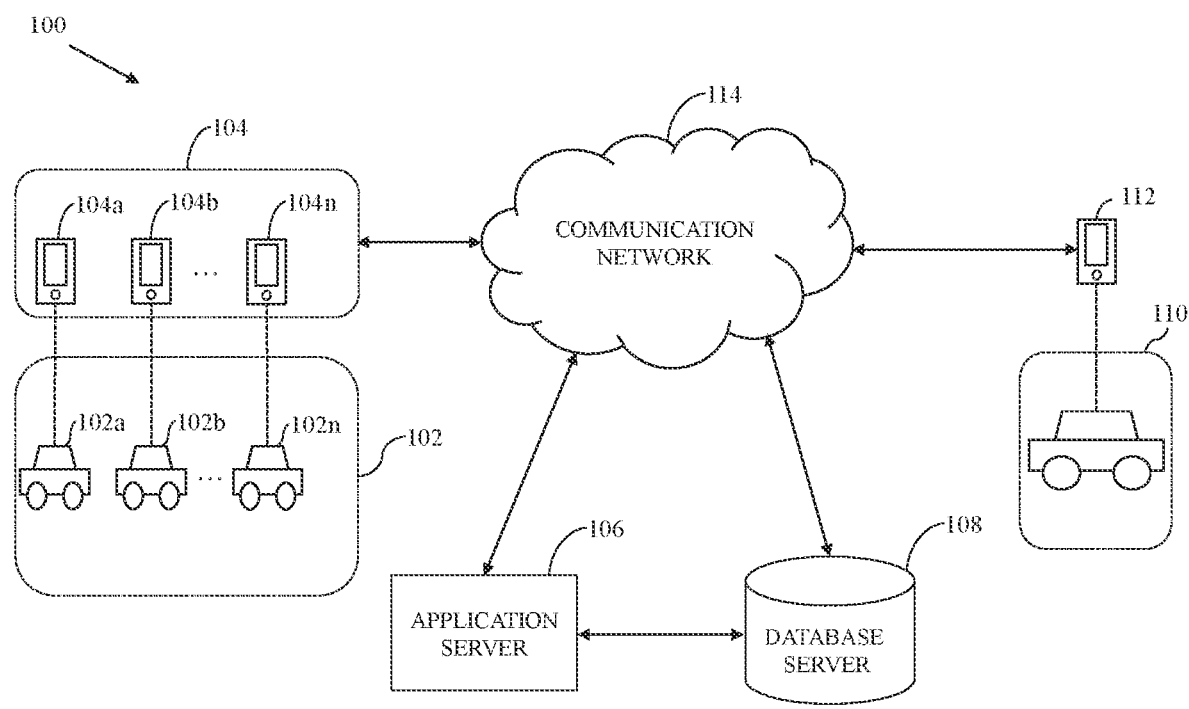
FIG. 1 is a block diagram that illustrates a system environment for detecting an authenticity of a ride in vehicle allocation, in accordance with an exemplary embodiment of the disclosure.

Certain embodiments of the disclosure may be found in a disclosed apparatus for detecting an authenticity of a ride in a ride hailing environment. Exemplary aspects of the disclosure provide a method and a system for detecting the authenticity of the ride in vehicle allocation. The method includes one or more operations that are executed by circuitry of an application server to detect the authenticity of the ride in the vehicle allocation. In an embodiment, the application server may be configured to retrieve historical location data and historical telecom data of a geographical region from a database server. Each historical location data may include at least latitude and longitude information of a location of the geographical region. Further, each historical telecom data may include at least Mobile Country Code (MCC), Mobile Network Code (MNC), Location Area Code (LAC) and Cell Identification (CI) of a cell tower of the geographical region. The application server may be further configured to determine a set of geohashes based on the retrieved historical location data. The application server may be further configured to determine a set of cell tower hashes based on the retrieved historical telecom data. Each geohash may correspond to a unique location and each cell tower hash may correspond to a unique cell tower. The application server may be further configured to generate a cellular network data corpus based on the set of geohashes and the set of cell tower hashes. The cellular network data corpus may include at least a mapping between one or more geohashes of the set of the geohashes and one or more cell tower hashes of the set of cell tower hashes. The application server may be further configured to receive first location data and first telecom data from a first driver device of a first driver of a first vehicle based on a ride request for the ride accepted by the first driver. The first location data may include current latitude and longitude information of a first location of the first vehicle or the first driver device when the ride request is accepted by the first driver. Further, the first telecom data may include at least MCC, MNC, LAC, and CI of a first cell tower associated with the first location of the first vehicle. The application server may be further configured to determine a first geohash based on the first location data and a first cell tower hash based on the first telecom data. The application server may be further configured to detect the authenticity of the ride based on at least the cellular network data corpus, the first geohash, and the first cell tower hash.

Prior to detecting the authenticity of the ride, the application server may be further configured to determine whether the first geohash is included in the cellular network data corpus. In one embodiment, based on the determination that the first geohash is included in the cellular network data corpus, the application server may be further configured to determine whether the first geohash is mapped to the first cell tower hash in the cellular network data corpus. The application server may be further configured to determine a first count of missing data. The first count of missing data may be determined, based on the determination that the first geohash is not mapped to the first cell tower hash in the cellular network data corpus. The application server may be further configured to receive, periodically, subsequent location data and subsequent telecom data from the first driver device. The subsequent location data and telecom data may be received to determine one or more subsequent counts of missing data. The subsequent location data and the subsequent telecom data may be received based on a determination that the first count of missing data is less than a first threshold value. The application server may be further configured to determine a total count of missing data based on at least the first count of missing data and the one or more subsequent counts of missing data. Further, the application server may determine the ride, accepted by the first driver, as an unauthentic ride based on a determination that the total count of missing data is greater than the first threshold value.

In another embodiment, based on the determination that the first geohash is not included in the cellular network data corpus, the application server may be further configured to determine whether the first cell tower hash has changed as compared to a previous cell tower hash. The application server may be further configured to reset a flag corresponding to a distance travelled without any change in cell towers. The flag may be reset based on the determination that the first cell tower hash has changed as compared to the previous cell tower hash. The application server may be further configured to determine a distance between a previous location data associated with the previous cell tower hash and the first location data associated with the first cell tower hash. The distance may be determined based on the determination that the first cell tower hash has not changed as compared to the previous cell tower hash. Further, the application server may determine the ride as an unauthentic ride, based on a determination that the distance is greater than a second threshold value.

Thus, various methods and systems of the disclosure provide detection of an authenticity of a ride in a ride hailing environment during the process of vehicle allocation in a geographical area. The authenticity of the ride may be detected using various parameters obtained from cellular network data, location data, and historical behavior of drivers and passengers in the ride hailing environment. The system comprises exemplary core entities such as drivers, driver devices, and vehicles. All of these exemplary entities are tracked using their respective device pings. If the device pings are real, bookings are classified as real. However, if the device pings are spoofed, bookings are classified as unauthentic or fake.

FIG. 1 is a block diagram that illustrates a system environment 100 for detecting an authenticity of a ride in vehicle allocation, in accordance with an exemplary embodiment of the disclosure. The system environment 100 includes a plurality of vehicles 102a-102n (hereinafter, designated and referred to as "the plurality of vehicles 102"), a plurality of driver devices 104a-104n (hereinafter, designated and referred to as "the plurality of driver devices 104"), an application server 106, and a database server 108. The system environment 100 further includes a first vehicle 110 and a first driver device 112. In an exemplary embodiment, the plurality of vehicles 102 may include the first vehicle 110 and the plurality of driver devices 104 may include the first driver device 112. Further, the plurality of driver devices 104, the application server 106, the database server 108, and the first driver device 112 may be communicatively coupled to each other via a communication network 114.

Each of the plurality of vehicles 102 may correspond to a mode of transport that is deployed by a vehicle transit system, such as a transport aggregator, to provide vehicle services to one or more passengers. The plurality of vehicles 102 may be associated with the plurality of driver devices 104, respectively. Each of the plurality of vehicles 102 may include suitable logic, circuitry, interfaces and/or code, executable by the circuitry, that may be configured to control and perform one or more operations with or without any driving assistance from the respective driver. In an embodiment, each of the plurality of vehicles 102 may be deployed by the transport aggregator to cater to travelling requirements of the one or more passengers. In another embodiment, each of the plurality of vehicles 102 may be privately owned by a user and may be used for fulfilling self-travelling requirements. Examples of each of the plurality of vehicles 102 may include, but are not limited to, an automobile, a bus, a car, an auto rickshaw, and a bike.

Each of the plurality of driver devices 104 may include suitable logic, circuitry, interfaces, and/or code, executable by the circuitry, that may be configured to perform one or more operations associated with the vehicle services. In an exemplary embodiment, each of the plurality of driver devices 104 may be a computing device that is utilized, by a respective driver, to perform one or more activities or operations by means of a service application (associated with a ride-hailing service provider) running on each of the plurality of driver devices 104. For example, each of the plurality of driver devices 104 may be utilized, by the respective driver, to view a new ride request communicated by the application server 106. Further, each of the plurality of driver devices 104 may be utilized, by the respective driver, to accept or reject the new ride request. Further, each of the plurality of driver devices 104 may be utilized, by the respective driver, to view passenger information of the one or more passengers and direction information between two or more locations based on the vehicle allocation by the application server 106. The direction information may be presented in the form of a digital map on each of the plurality of driver devices 104 based on the vehicle allocation. Further, each of the plurality of driver devices 104 may be utilized, by the respective driver, to input preferences for various parameters and/or various types of rides, locations, working time durations, or the like. Further, each of the plurality of driver devices 104 may be configured to allow each driver to communicate with the ride-hailing service provider or a server associated with the ride-hailing service provider such as the application server 106 or the database server 108 in an online manner. Such communication may be facilitated by using the service application running on each of the plurality of driver devices 104. Further, each of the plurality of driver devices 104 may be configured to periodically (for example, after a fixed interval of time duration such as 5 seconds, 10 seconds, 30 seconds, 1 minute, 2 minutes, 5 minutes, or the like) capture and transmit data (such as location and telecom data) to the application server 106 or the database server 108 via the communication network 114. In an exemplary embodiment, each of the plurality of driver devices 104 may be configured to serve as an interface for automatically collecting and providing the location data and telecom data of a geographical region to the application server 106 or the database server 108 via the communication network 114. The location data and the telecom data associated with a historical time period may be stored as the historical location data and the historical telecom data in the database server 108. The historical location data may include location data of one or more locations and the historical telecom data may include telecom data of one or more cell towers that are collected based on historical ride-related events associated with the plurality of vehicles 102. In an exemplary embodiment, the historical location data may include at least latitude and longitude information of each of the plurality of driver devices 104 (or each of the plurality of vehicles 102) during one or more historical rides associated with the plurality of vehicles 102 while travelling across various locations of the geographical region. Further, the historical telecom data may include a Cell Global Identity (CGI) associated with each of the one or more cell towers and/or the plurality of driver devices 104 during the one or more historical rides. The CGI is a unique identifier for a base transceiver station in mobile phone networks. The CGI may include one or more parts such as Mobile Country Code (MCC), Mobile Network Code (MNC), Location Area Code (LAC) and Cell Identification (CI). Examples of each of the plurality of driver devices 104 may include, but are not limited to, a personal computer, a laptop, a smartphone, a tablet, or any other device capable of communicating via the communication network 114.

The application server 106 may include suitable logic, circuitry, interfaces, and/or code, executable by the circuitry, that may be configured to perform one or more operations associated with the detection of the authenticity of the ride in the vehicle allocation. The application server 106 may be a computing device, which may include a software framework, that may be configured to create the application server implementation and perform the various operations. The application server 106 may be realized through various web-based technologies, such as, but are not limited to, a Java web-framework, a .NET framework, a professional hypertext preprocessor (PHP) framework, a python framework, or any other web-application framework. The application server 106 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the application server 106 may include, but are not limited to, a personal computer, a laptop, a mini-computer, a mainframe computer, a cloud-based server, a network of computer systems, or a non-transient and tangible machine executing a machine-readable code.

In an embodiment, the application server 106 may be configured to host the service application on each of the plurality of driver devices 104 and may facilitate one or more online services associated with the vehicle allocation. In an embodiment, the application server 106 may be configured to receive one or more ride requests from one or more passenger devices (not shown) of one or more passengers. Further, the application server 106 may be configured to transmit the one or more ride requests to one or more driver devices (from the plurality of driver devices 104) associated with one or more available vehicles (from the plurality of vehicles 102) via the communication network 114. Based on acceptance of the one or more ride requests by one or more drivers of the one or more available vehicles, the application server 106 may be configured to allocate the one or more available vehicles (from the plurality of vehicles 102) to the one or more passengers.

In an embodiment, the application server 106 may be further configured to retrieve the historical location data and the historical telecom data of the geographical region from the database server 108 via the communication network 114. The application server 106 may be further configured to determine a set of geohashes based on the retrieved historical location data. The application server 106 may be further configured to determine a set of cell tower hashes based on the retrieved historical telecom data. The application server 106 may be further configured to generate a cellular network data corpus based on the determined set of geohashes and the determined set of cell tower hashes. The cellular network data corpus may correspond to a database table that includes at least a mapping between one or more geohashes of the set of the geohashes and one or more cell tower hashes of the set of cell tower hashes.

In an embodiment, the application server 106 may be further configured to receive a first ride request for a first ride initiated by a first passenger from a first passenger device (not shown). Based on the acceptance of the first ride request by a first driver associated with the first vehicle 110, the first driver device 112 (or the service application running on the first driver device 112) may be configured to capture and transmit first location data and first telecom data to the application server 106 via the communication network 114. In an embodiment, the application server 106 may be further configured to determine a first geohash and a first cell tower hash based on the first location data and the first telecom data, respectively. The application server 106 may be further configured to detect the authenticity of the first ride based on at least the cellular network data corpus, the first geohash, and the first cell tower hash. Various operations of the application server 106 have been described in detail in conjunction with FIGS. 2, 3, 4A-4C, and 5.

The database server 108 may include suitable logic, circuitry, interfaces, and/or code, executable by the circuitry, that may be configured to perform one or more database operations, such as receiving, storing, processing, and transmitting queries, data, information, messages, or content. The database server 108 may be a data management and storage computing device that is communicatively coupled to the communication network 114 for performing the one or more database operations, such as receiving, storing, processing, and transmitting queries, data, information, messages, or content, such as driver information, vehicle information, passenger information, booking information, allocation information, fare information, or the like. The query, data, or content may be received/transmitted from/to various components of the system environment 100, such as the plurality of driver devices 104, the application server 106, the first driver device 112, or one or more passenger devices (not shown).

In an exemplary embodiment, the database server 108 may be configured to manage and store the driver information of each driver (such as the plurality of drivers associated with the plurality of vehicles 102 including the first vehicle 110), the vehicle information of each vehicle (such as the plurality of vehicles 102 including the first vehicle 110), and the passenger information of each passenger. For example, the driver information of each driver may include information such as a driver's name, a driver's contact number, a driver's rating, a driver's vehicle and its type, or information pertaining to a driver's account registered with ride hailing service provider. The vehicle information of each vehicle may include information such as a registered vehicle make, a vehicle type, a vehicle capacity, a vehicle number, or other vehicle-related information. The passenger information of each passenger may include information such as a passenger's name, a passenger's contact number, a passenger's rating, a passenger's behavioral information, or information pertaining to a passenger's account registered with the ride hailing service provider.

Further, the database server 108 may be configured to manage and store historical booking data, for example, historical demand and supply associated with the geographical region and historical pick-up and drop-off locations associated with each historical demand and supply. The database server 108 may be further configured to manage and store historical or real-time traffic information along one or more routes of the geographical region. The database server 108 may be further configured to manage and store real-time booking data (for example, the first ride request) that is received in real-time from the one or more passenger devices of the one or more passengers (such as the first passenger device of the first passenger). The database server 108 may be further configured to manage and store the allocation information of the one or more vehicles from the plurality of vehicles 102. The database server 108 may be further configured to manage and store the real-time and historical location data and telecom data associated with the plurality of vehicles 102. Each location data may include latitude, longitude, and/or altitude information representing a position of each vehicle. Each telecom data may include MCC, MNC, LAC, and CI associated with at least one of a cell tower or a driver device. The database server 108 may be further configured to manage and store the set of geohashes and the set of cell tower hashes determined based on the historical location data and the historical telecom data, respectively. The database server 108 may be further configured to manage and store the cellular network data corpus generated by the application server 106. The database server 108 may be further configured to manage and store the first location data and the first telecom data received from the first driver device 112. The database server 108 may be further configured to manage and store the first geohash and the first cell tower hash determined by the application server 106.

In an embodiment, the database server 108 may be configured to receive a query from the application server 106 via the communication network 114. The query may be an encrypted message that is decoded by the database server 108 to determine a request for retrieving requisite information (such as the vehicle information, the driver information, the passenger information, the allocation information, the historical location data, the historical telecom data, the cellular network data corpus, the first location data, the first telecom data, or the like) stored in the database server 108. In response to the determined request, the database server 108 may be configured to retrieve and communicate the requested information to the application server 106 via the communication network 114. The database server 108 may be implemented as a cloud-based server. Examples of the database server 108 may include, but are not limited to, Hadoop®, MongoDB®, MySQL®, NoSQL®, and Oracle®.

The communication network 114 may include suitable logic, circuitry, interfaces, and/or code, executable by the circuitry, that may be configured to transmit queries, messages, data, and requests between various entities, such as the plurality of driver devices 104, the application server 106, the database server 108, and the first driver device 112. Examples of the communication network 114 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the system environment 100 may be coupled to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, each of the plurality of driver devices 104 may be configured to periodically capture and transmit data (such as the location and telecom data) to the application server 106 or the database server 108 via the communication network 114. In one example, such data may be periodically captured by one or more sensors installed in each of the plurality of driver devices 104. In another example, such data may be periodically captured by the service application running on each of the plurality of driver devices 104. In another example, such data may be periodically captured by the service application in conjunction with the one or more sensors. The periodic capturing and transmitting of the data may be executed after a fixed interval of time duration such as 5 seconds, 10 seconds, 30 seconds, 1 minute, 2 minutes, 5 minutes, or the like. The location data and the telecom data associated with a historical time period may be stored as the historical location data and the historical telecom data in the database server 108. The historical location data may include location data of one or more locations and the historical telecom data may include telecom data of one or more cell towers. The historical location data may include location data that may be collected during the historical ride-related events (such as during one or more historical rides) associated with the plurality of vehicles 102. In an exemplary embodiment, the historical location data may include at least latitude and longitude information of each of the plurality of driver devices 104 (or each of the plurality of vehicles 102) during the one or more historical rides associated with the plurality of vehicles 102 while travelling across various locations of the geographical region. Further, the historical telecom data may include a Cell Global Identity (CGI) associated with each of the one or more cell towers and/or the plurality of driver devices 104 during the one or more historical rides. The CGI may include one or more parts such as Mobile Country Code (MCC), Mobile Network Code (MNC), Location Area Code (LAC) and Cell Identification (CI).

Further, the application server 106 may be configured to retrieve the historical location data and the historical telecom data of the geographical region from the database server 108 via the communication network 114. The application server 106 may be further configured to determine the set of geohashes based on the retrieved historical location data. The application server 106 may be further configured to determine the set of cell tower hashes based on the retrieved telecom data. The set of geohashes may include one or more geohashes, with each geohash corresponding to a unique location in the geographical region. The set of cell tower hashes may include one or more cell tower hashes, with each cell tower hash corresponding to a unique cell tower in the geographical region. In an exemplary embodiment, a geohash for a location may be determined based on at least the latitude and longitude information associated with the location. Further, a cell tower hash for a cell tower may be determined based on at least one of MCC, MNC, LAC, and CI associated with the cell tower. The cell tower hash is a hash function of at least one of MCC, MNC, LAC, and CI.

Further, the application server 106 may be configured to generate the cellular network data corpus based on the set of geohashes and the set of cell tower hashes. In an embodiment, the cellular network data corpus may correspond to a database table including the set of geohashes corresponding to the one or more locations and the set of cell towers hashes corresponding to the one or more cell towers in the geographical region. The cellular network data corpus may include at least the mapping between the set of geohashes (i.e., the one or more geohashes corresponding to the one or more locations of the geographical region) and the set of cell tower hashes (i.e., the one or more cell tower hashes corresponding to the one or more cell towers of the geographical region). In some examples, the one or more geohashes may be mapped to one cell tower hash. In some other examples, one geohash may be mapped to the one or more cell tower hashes.

Further, the application server 106 may be configured to receive the first ride request for the first ride initiated by the first passenger from the first passenger device (not shown). The application server 106 may be further configured to transmit the first ride request to the one or more driver devices (such as the first driver device 112) of the one or more available vehicles (such as the first vehicle 110) associated with the one or more drivers (such as the first driver). In an exemplary scenario, the first ride request is accepted by the first driver of the first vehicle 110. Based on the acceptance of the first ride request by the first driver, the first driver device 112 (or the service application running on the first driver device 112) may be configured to generate and transmit a ride acceptance notification to the application server 106 via the communication network 114. The application server 106 may be further configured to receive the ride acceptance notification from the first driver device 112 and then request the first driver device 112 (or the service application running on the first driver device 112) for obtaining the first location data and the first telecom data. In response to the request, the first driver device 112 (or the service application running on the first driver device 112) may be configured to transmit the first location data and the first telecom data to the application server 106 via the communication network 114. In some embodiments, the application server 106 may be configured to automatically receive the first location data and the first telecom data from the first driver device 112, based on an acceptance of the first ride request by the first driver of the first vehicle 110. The first location data may correspond to current location information (including at least the current latitude and longitude information) of a first location of the first vehicle 110 or the first driver device 112 when the first ride request is accepted by the first driver of the first vehicle 110. Further, the first telecom data may correspond current CGI information (including at least one of the MCC, MNC, LAC, and CI) of at least one cell tower associated with the current location information of the first vehicle 110.

Further, the application server 106 may be configured to determine the first geohash and the first cell tower hash based on the first location data and the first telecom data, respectively. The first geohash may be determined based on at least the current latitude and longitude information associated with the first vehicle 110 or the first driver device 112. Further, the first cell tower hash may be determined based on at least one of the current MCC, MNC, LAC, and CI of at least one cell tower associated with the current location information of the first vehicle 110. Upon determining the first geohash and the first cell tower hash, the application server 106 may be further configured to determine whether the first geohash is included in the cellular network data corpus.

In an embodiment, based on the determination that the first geohash is included in the cellular network data corpus, the application server 106 may be further configured to determine whether the first geohash is mapped to the first cell tower hash in the cellular network data corpus. The application server 106 may determine the first ride as an authentic ride (accepted by the first driver), based on the determination that the first geohash is mapped to the first cell tower hash in the cellular network data corpus. However, based on the determination that the first geohash is not mapped to the first cell tower hash in the cellular network data corpus, the application server 106 may be further configured to determine a first count of missing data. The first count of missing data may indicate a first instance at which the mapping between the first geohash and the first cell tower hash is not present in the cellular network data corpus. The first count of missing data may be determined by assigning a first integer value (such as "1") that indicates the first instance at which the mapping between the first geohash and the first cell tower hash is not present in the cellular network data corpus. Upon determining the first count of missing data, the application server 106 may be further configured to periodically (for example, after a fixed interval of time duration such as 5 seconds, 10 seconds, 30 seconds, 1 minute, 2 minutes, 5 minutes, or the like) receive subsequent location data (such as second location data, third location data, and so on) and subsequent telecom data (such as second telecom data, third telecom data, and so on) from the first driver device 112 via the communication network 114. The subsequent location data and the subsequent telecom data may be received in sequence after the first location data and the first telecom data. Further, the application server 106 may be configured to determine one or more subsequent counts of missing data based on the received subsequent location data and the received subsequent telecom data. Each subsequent count of missing data may be determined by assigning a first integer value (such as "1") that indicates a subsequent instance at which the mapping between a corresponding geohash and a corresponding cell tower hash is not present in the cellular network data corpus. In an exemplary embodiment, the one or more subsequent counts of missing data may be determined based on a determination that the first count of missing data is less than a first threshold value. The first threshold value may correspond to an integer value, for example, "3". After the determination of each subsequent count of missing data, the application server 106 may be further configured to determine a total count of missing data. The total count of missing data may be determined based on the first count of missing data and the one or more subsequent counts of missing data. In an exemplary embodiment, the total count of missing data may be determined as a sum of the first count of missing data and the one or more subsequent counts of missing data associated with a defined time duration (for example, "5 minutes") post the acceptance of the first ride request by the first driver of the first vehicle 110. For example, after a first subsequent count of missing data, the total count of missing data may be determined as a sum of the first count of missing data ("1") and the first subsequent count of missing data ("1"). Thus, after the first subsequent count of missing data, the total count of missing data may be determined as "2" (=1+1). Since the total count of missing data (i.e., "2") is less than the first threshold value (i.e., "3"), a second subsequent count of missing data may be determined. Further, the total count of missing data may be determined as a sum of the first count of missing data ("1"), the first subsequent count of missing data ("1"), and the second subsequent count of missing data ("1"). Thus, after the second subsequent count of missing data, the total count of missing data may be determined as "3" (=1+1+1). Since the total count of missing data (i.e., "3") is equal to the first threshold value (i.e., "3"), a third subsequent count of missing data may be determined. Further, the total count of missing data may be determined as a sum of the first count of missing data ("1"), the first subsequent count of missing data ("1"), the second subsequent count of missing data ("1"), and the third subsequent count of missing data ("1"). Thus, after the third subsequent count of missing data, the total count of missing data may be determined as "4" (=1+1+1+1). Since the total count of missing data (i.e., "4") is greater than the first threshold value (i.e., "3"), the application server 106 may detect the first ride as an unauthentic or fake ride. In some embodiments, when the total count of missing data (i.e., "3") is equal to the first threshold value (i.e., "3"), the application server 106 may detect the first ride as an unauthentic or fake ride. When the first ride (accepted by the first driver of the first vehicle 110) is detected as the unauthentic or fake ride, the application server 106 may not allocate the first vehicle 110 to first passenger for providing the ride services corresponding the first ride request. The application server 106 may choose another available vehicle (such as a second vehicle associated with a second driver) from the plurality of vehicles 102 and allocate the second vehicle to the first passenger for providing the ride services corresponding the first ride request when it is determined that the first ride accepted by the second driver is an authentic ride.

In another embodiment, based on the determination that the first geohash is not included in the cellular network data corpus, the application server 106 may be further configured to determine whether the first cell tower hash has changed as compared to a previous cell tower hash. In an exemplary embodiment, based on the determination that the first cell tower hash has changed as compared to the previous cell tower hash, the application server 106 may be further configured to reset a flag corresponding to a variable "distance travelled without change in cell towers". However, based on the determination that the first cell tower hash has not changed as compared to the previous cell tower hash, the application server 106 may be further configured to determine a first distance between a previous location data associated with the previous cell tower hash and the first location data associated with the first cell tower hash. Further, the application server 106 may add the first distance to the variable "distance travelled without change in cell towers". The application server 106 may be further configured to determine whether the first distance (or the distance travelled without change in cell towers) is greater than a second threshold value. The second threshold value may correspond to an integer or non-integer value, for example, "2 KM". Based on the determination that the first distance (or the distance travelled without change in cell towers) is not greater than the second threshold value, the application server 106 may not take any action. Further, during the ongoing trip, if any known cell tower hash is encountered, the application server 106 may reset the flag corresponding to the variable "distance travelled without change in cell towers" and the application server 106 may detect the first ride (accepted by the first driver) as an authentic ride. However, based on the determination that the first distance (or the distance travelled without change in cell towers) is greater than the second threshold value, the application server 106 may detect the first ride as an unauthentic or fake ride. When the first ride (accepted by the first driver of the first vehicle 110) is detected as the unauthentic or fake ride, the application server 106 may not allocate the first vehicle 110 to first passenger for providing the ride services corresponding the first ride request. The application server 106 may choose another available vehicle (such as a second vehicle associated with a second driver) from the plurality of vehicles 102 and allocate the second vehicle to the first passenger for providing the ride services corresponding the first ride request when it is determined that the first ride accepted by the second driver is an authentic ride.

Figure 2:
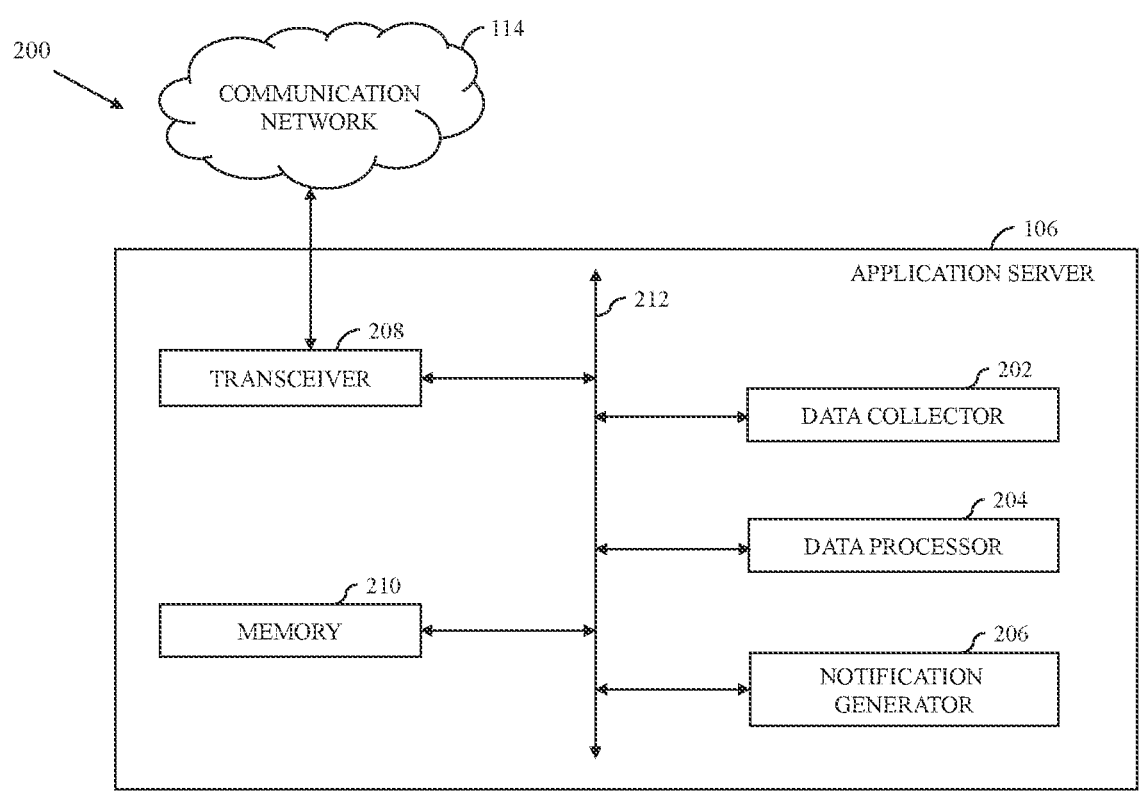
FIG. 2 is a block diagram that illustrates an application server of the system environment of FIG. 1, in accordance with an exemplary embodiment of the disclosure.

FIG. 2 is a block diagram that illustrates the application server 106, in accordance with an exemplary embodiment of the disclosure. The application server 106 includes circuitry such as a data collector 202, a data processor 204, a notification generator 206, a transceiver 208, and a memory 210 that communicate with each other by way of a communication bus 212.

The data collector 202 includes suitable logic, circuitry, interfaces, and/or code, executable by the circuitry, that may be configured to perform one or more operations associated with data collection. The data collector 202 may be implemented by one or more processors, such as, but are not limited to, an application-specific integrated circuit (ASIC) processor, a reduced instruction set computing (RISC) processor, a complex instruction set computing (CISC) processor, and a field-programmable gate array (FPGA) processor. Further, the data collector 202 may include a machine-learning model that implements any suitable machine-learning techniques, statistical techniques, or probabilistic techniques for performing the one or more operations associated with the data collection. The one or more processors may also correspond to central processing units (CPUs), graphics processing units (GPUs), network processing units (NPUs), digital signal processors (DSPs), or the like.

In an exemplary embodiment, the data collector 202 may be configured to collect the location data and the telecom data from each of the plurality of driver devices 104 by way of the transceiver 208 via the communication network 114. The data collector 202 may be further configured to store the collected location and telecom data as the historical location and telecom data in the memory 210 or the database server 108. The data collector 202 may be further configured to receive the first location data and the first telecom data from the first driver device 112 by way of the transceiver 208 via the communication network 114. The data collector 202 may be further configured to store the first location data and the first telecom data in the memory 210 or the database server 108.

The data processor 204 includes suitable logic, circuitry, interfaces, and/or code, executable by the circuitry, that may be configured to perform one or more operations associated with detection of the authenticity of the one or more rides in real time. Examples of the data processor 204 may include, but are not limited to, an ASIC processor, a RISC processor, a CISC processor, and an FPGA processor. The data processor 204 may also correspond to a CPU, a GPU, an NPU, a DSP, or the like. It will be apparent to a person of ordinary skill in the art that the data processor 204 may be compatible with multiple operating systems.

In an exemplary embodiment, the data processor 204 may be configured to retrieve the historical location data and the historical telecom data of the geographical region from the memory 210 or the database server 108. The data processor 204 may be further configured to determine the set of geohashes based on the retrieved historical location data and the set of cell tower hashes based on the retrieved historical telecom data. The data processor 204 may be further configured to generate the cellular network data corpus based on the set of geohashes and the set of cell tower hashes. The data processor 204 may be further configured to receive the first location data and the first telecom data from the first driver device 112 of the first driver of the first vehicle 110 based on the first ride request for the first ride accepted by the first driver. Alternatively, the data processor 204 may retrieve the first location data and the first telecom data from the memory 210. The data processor 204 may be further configured to determine the first geohash based on the first location data and the first cell tower hash based on the first telecom data. The data processor 204 may be further configured to detect the authenticity of the first ride based on at least the cellular network data corpus, the first geohash, and the first cell tower hash.

The notification generator 206 includes suitable logic, circuitry, interfaces, and/or code, executable by the circuitry, that may be configured to perform one or more operations associated with notification generation. The notification generator 206 may be implemented by one or more processors, such as, but are not limited to, an ASIC processor, a RISC processor, a CISC processor, and an FPGA processor. Further, the notification generator 206 may include a machine-learning model that implements any suitable machine-learning techniques, statistical techniques, or probabilistic techniques for performing the one or more operations associated with the notification generation. The one or more processors may also correspond to CPUs, GPUs, NPUs, DSPs, or the like.

In an exemplary embodiment, the notification generator 206 may be configured to generate one or more notifications associated with vehicle allocation and ride authentication in real-time. For example, the notification generator 206 may be configured to generate a ride notification corresponding to the first ride request initiated by the first passenger for the first ride and communicate the ride notification to the one or more drivers associated with the one or more available vehicles (such as the first driver associated with the first vehicle 110). The notification generator 206 may be further configured to generate an allocation notification based on the allocation of the first vehicle 110 to the first passenger and communicate the allocation notification to the first driver device 112 and the first passenger device (not shown). The notification generator 206 may be further configured to generate a driver notification including the driver information of the first driver of the first vehicle 110 allocated to the first passenger and communicate the driver notification to the first passenger device. The notification generator 206 may be further configured to generate a vehicle notification including the vehicle information of the first vehicle 110 allocated to the first passenger and communicate the vehicle notification to the first passenger device. The notification generator 206 may be further configured to generate a passenger notification including the passenger information of the first passenger and communicate the passenger notification to the first driver device 112 of the first vehicle 110 allocated to the first passenger. The notification generator 206 may be further configured to generate an authentication notification including a result of the authentication of the first ride accepted by the first driver of the first vehicle 110 and communicate the authentication notification to at least one of the first driver device 112 or the first passenger device.

The transceiver 208 may include suitable logic, circuitry, interfaces, and/or code, executable by the circuitry, that may be configured to transmit (or receive) data to (or from) various servers or devices, such as the plurality of driver devices 104, the database server 108, or the first driver device 112 via the communication network 114. Examples of the transceiver 208 may include, but are not limited to, an antenna, a radio frequency transceiver, a wireless transceiver, and a Bluetooth® transceiver. The transceiver 208 may be configured to communicate with the plurality of driver devices 104, the database server 108, or the first driver device 112 using various wired and wireless communication protocols, such as TCP/IP, UDP, LTE communication protocols, or any combination thereof.

The memory 210 may include suitable logic, circuitry, interfaces, and/or code, executable by the circuitry, that may be configured to store one or more instructions that are executed by the data collector 202, the data processor 204, the notification generator 206, and the transceiver 208 to perform their operations. In an exemplary embodiment, the memory 210 may be configured to temporarily store the historical location and telecom data. The memory 210 may be further configured to temporarily store the one or more ride requests such as the first ride request initiated by the first passenger. The memory 210 may be further configured to temporarily store the cellular network data corpus that includes at least the mapping between the one or more geohashes of the one or more locations in the geographical region and the one or more cell tower hashes of the one or more cell towers in the geographical region. The memory 210 may be further configured to temporarily store the first location data and the first telecom data received from the first driver device 112 of the first driver of the first vehicle 110 based on the first ride request for the first ride accepted by the first driver. The memory 210 may be further configured to temporarily store the first geohash and the first cell tower hash. The memory 210 may be further configured to temporarily store the one or more notifications associated with vehicle allocation and ride authentication. The memory 210 may be further configured to temporarily store the first threshold value and the second threshold value. Examples of the memory 210 may include, but are not limited to, a random-access memory (RAM), a read-only memory (ROM), a programmable ROM (PROM), and an erasable PROM (EPROM).

It will be apparent to a person skilled in the art that the scope of the disclosure is not limited to realizing the memory 210 in the application server 106, as described herein. In some embodiments, the memory 210 may be realized in the form of the database server 108 working in conjunction with the application server 106, without departing from the scope of the disclosure.

Figure 3:
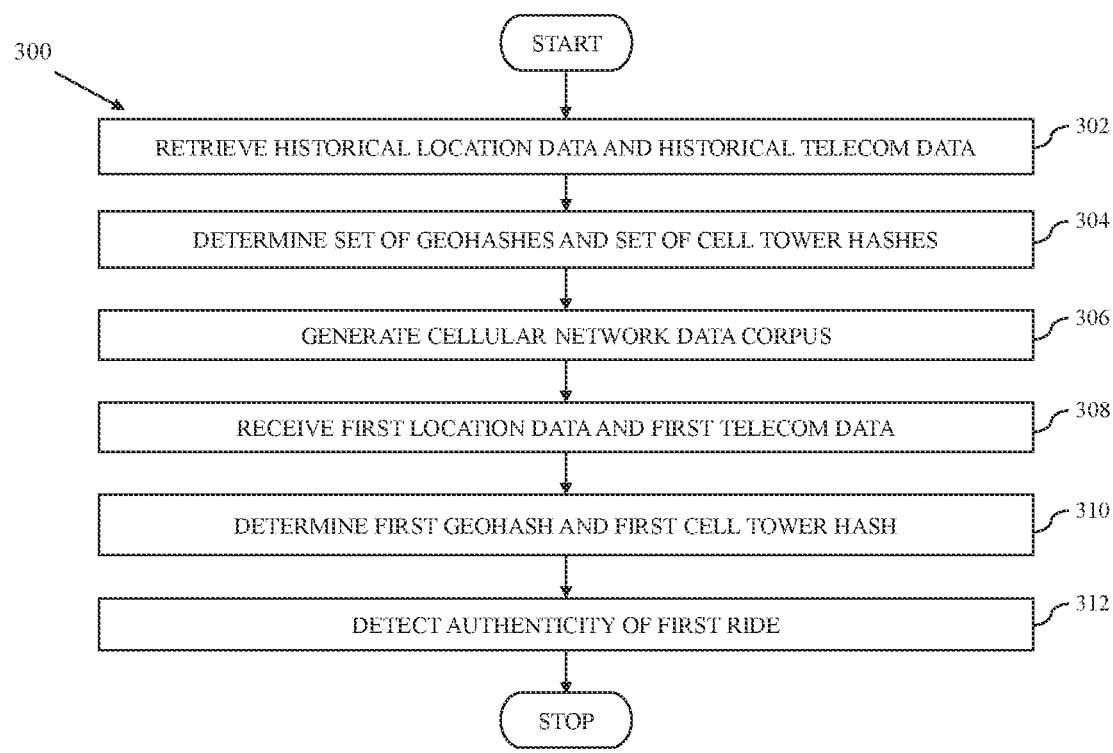
FIG. 3 is a diagram that illustrates a flow chart of a method for detecting the authenticity of the ride in the vehicle allocation, in accordance with an exemplary embodiment of the disclosure.

FIG. 3 is a diagram that illustrates a flow chart 300 of a method for detecting the authenticity of the first ride in the vehicle allocation, in accordance with an exemplary embodiment of the disclosure.

At 302, the historical location data and the historical telecom data of the geographical region are retrieved. In an embodiment, the application server 106 may be configured to retrieve the historical location data and the historical telecom data of the geographical region from the database server 108. In another embodiment, the application server 106 may be configured to retrieve the historical location data and the historical telecom data of the geographical region from the plurality of driver devices 104.

At 304, the set of geohashes and the set of cell tower hashes are determined. In an embodiment, the application server 106 may be further configured to determine the set of geohashes based on the retrieved historical location data and the set of cell tower hashes based on the retrieved historical telecom data. In an embodiment, the set of geohashes may include the one or more geohashes corresponding to the one or more locations of the geographical region, with each geohash corresponding to a unique location of the geographical region. Further, the set of cell tower hashes may include the one or more cell tower hashes of the geographical region, with each cell tower hash corresponding to a unique cell tower of the geographical region.

At 306, the cellular network data corpus is generated. In an embodiment, the application server 106 may be further configured to generate the cellular network data corpus based on at least the set of geohashes and the set of cell tower hashes. In an embodiment, the cellular network data corpus may include at least the mapping between the one or more geohashes of the set of geohashes and the one or more cell tower hashes of the set of cell tower hashes.

At 308, the first location data and the first telecom data are received. In an embodiment, the application server 106 may be further configured to receive the first location data and the first telecom data from the first driver device 112 of the first driver of the first vehicle 110. The first location data and the first telecom data may be received from the first driver device 112 based on the first ride request for the first ride initiated by the first passenger and accepted by the first driver of the first vehicle 110. The first location data may correspond to the current location information (including at least the latitude and longitude information) of the first location of the first vehicle 110 or the first driver device 112 based on an acceptance of the first ride request by the first driver of the first vehicle 110. Further, the first telecom data may correspond the current CGI information (including at least one of the MCC, MNC, LAC, and CI) of at least one cell tower associated with the current location information of the first vehicle 110.

At 310, the first geohash and the first cell tower hash are determined. In an embodiment, the application server 106 may be further configured to determine the first geohash based on the first location data and the first cell tower hash based on the first telecom data. For example, the first geohash may be determined based on at least the latitude and longitude information associated with the current location information of the first vehicle 110 or the first driver device 112. The first cell tower hash may be determined based on at least one of the MCC, MNC, LAC, and CI of at least one cell tower associated with the current location information of the first vehicle 110.

At 312, the authenticity of the first ride is detected. In an embodiment, the application server 106 may be further configured to detect the authenticity of the first ride based on at least the cellular network data corpus, the first geohash, and the first cell tower hash.

Figure 4A:
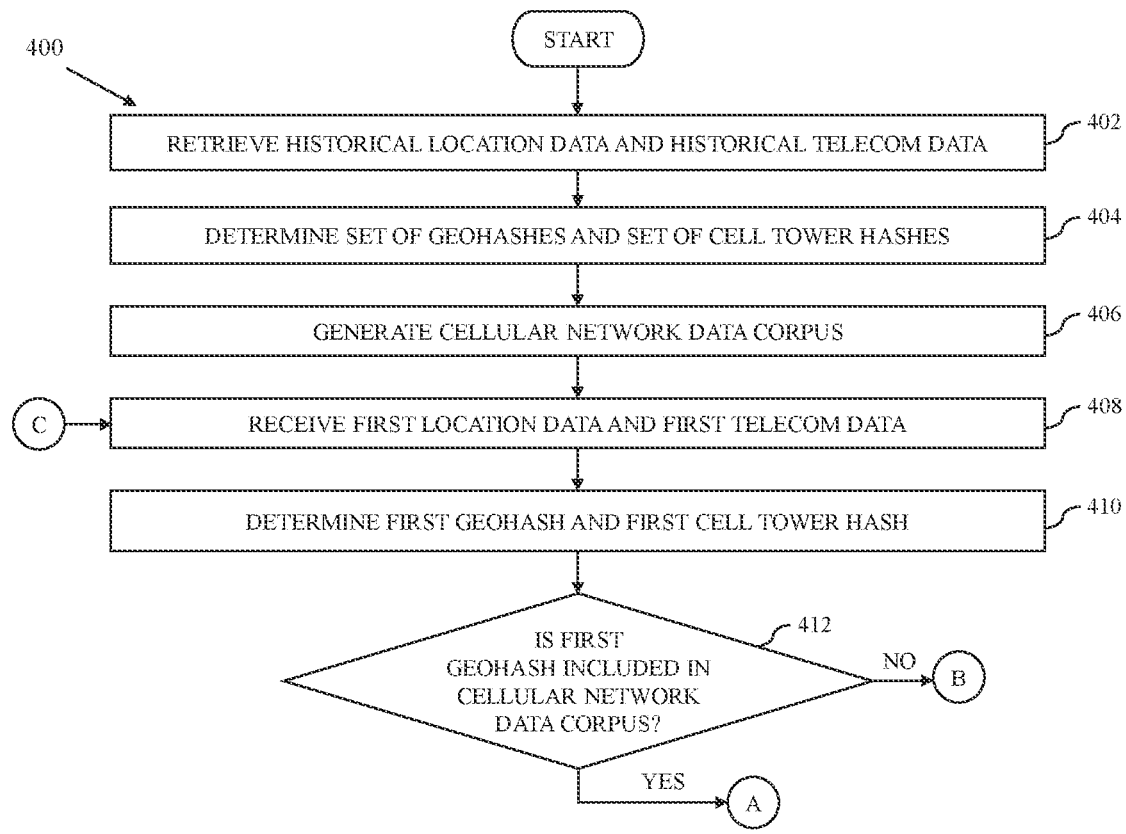
FIGS. 4A, 4B, and 4C, collectively, is a diagram that illustrates a flow chart of a method for detecting the authenticity of the ride in the vehicle allocation, in accordance with another exemplary embodiment of the disclosure.
Figure 4B:
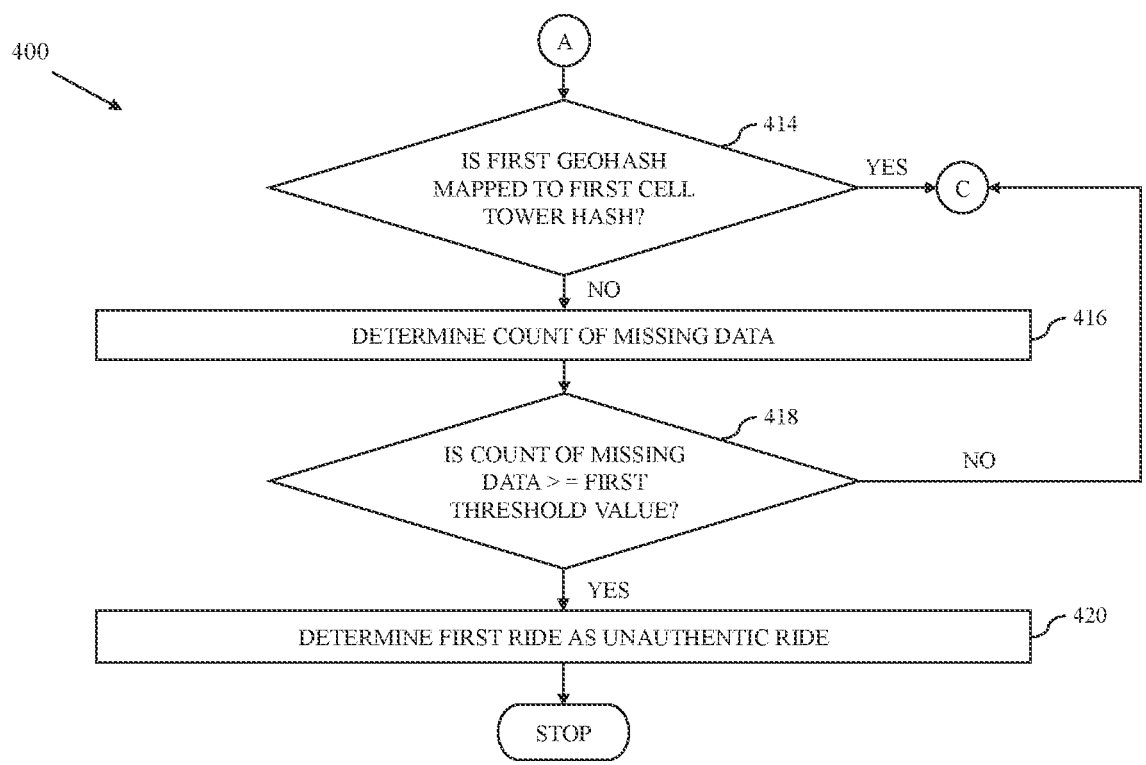
Figure 4C:
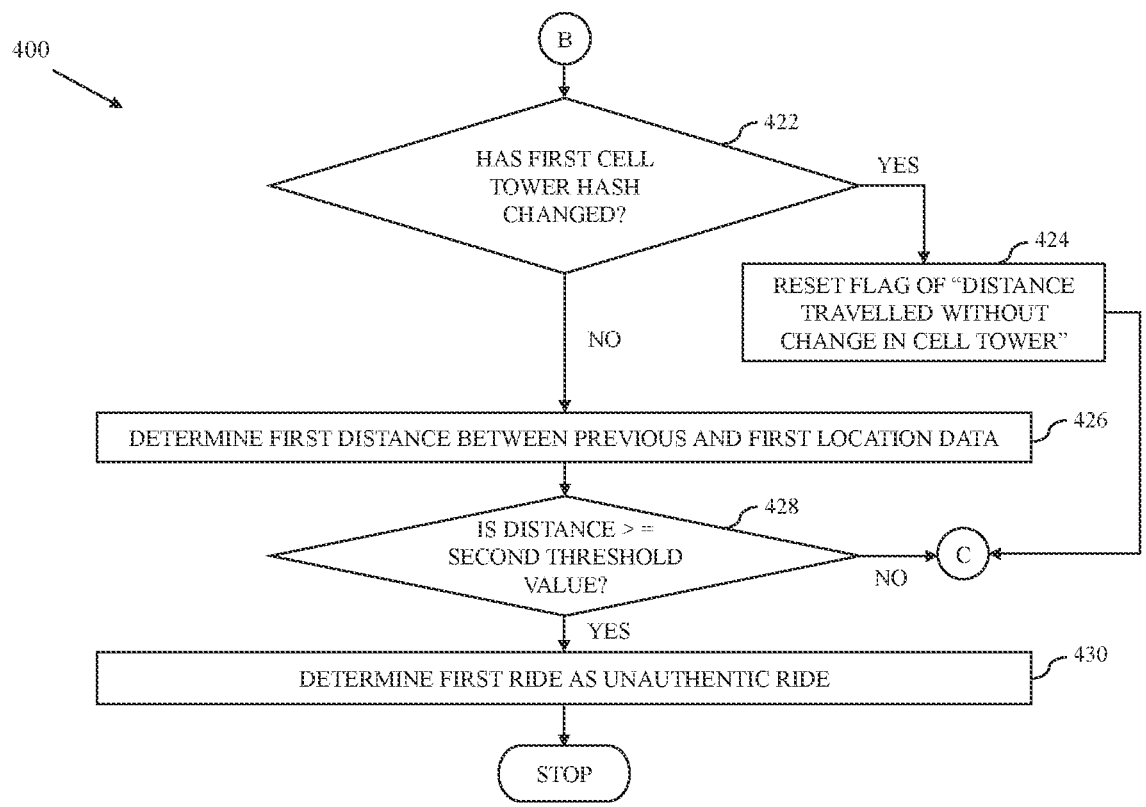

FIGS. 4A, 4B, and 4C, collectively, is a diagram that illustrates a flow chart 400 of a method for detecting the authenticity of the first ride in the vehicle allocation, in accordance with an exemplary embodiment of the disclosure.

At 402, the historical location data and the historical telecom data of the geographical region are retrieved. In an embodiment, the application server 106 may be configured to retrieve the historical location data and the historical telecom data of the geographical region from the database server 108. In another embodiment, the application server 106 may be configured to retrieve the historical location data and the historical telecom data of the geographical region from the plurality of driver devices 104.

At 404, the set of geohashes and the set of cell tower hashes are determined. In an embodiment, the application server 106 may be further configured to determine the set of geohashes based on the retrieved historical location data and the set of cell tower hashes based on the retrieved historical telecom data. In an embodiment, the set of geohashes may include the one or more geohashes corresponding to the one or more locations of the geographical region, with each geohash corresponding to a unique location of the geographical region. Further, the set of cell tower hashes may include the one or more cell tower hashes of the geographical region, with each cell tower hash corresponding to a unique cell tower of the geographical region.

At 406, the cellular network data corpus is generated. In an embodiment, the application server 106 may be further configured to generate the cellular network data corpus based on at least the set of geohashes and the set of cell tower hashes. In an embodiment, the cellular network data corpus may include at least the mapping between the one or more geohashes of the set of geohashes and the one or more cell tower hashes of the set of cell tower hashes.

At 408, the first location data and the first telecom data are received. In an embodiment, the application server 106 may be further configured to receive the first location data and the first telecom data from the first driver device 112 of the first driver of the first vehicle 110. The first location data and the first telecom data may be received from the first driver device 112 based on the first ride request for the first ride initiated by the first passenger and accepted by the first driver of the first vehicle 110. The first location data may correspond to the current location information (including at least the latitude and longitude information) of the first location of the first vehicle 110 or the first driver device 112 based on the acceptance of the first ride request by the first driver of the first vehicle 110. Further, the first telecom data may correspond the current CGI information (including at least one of the MCC, MNC, LAC, and CI) of at least one cell tower associated with the current location information of the first vehicle 110.

At 410, the first geohash and the first cell tower hash are determined. In an embodiment, the application server 106 may be further configured to determine the first geohash based on the first location data and the first cell tower hash based on the first telecom data. For example, the first geohash may be determined based on at least the latitude and longitude information associated with the current location information of the first vehicle 110 or the first driver device 112. The first cell tower hash may be determined based on at least one of the MCC, MNC, LAC, and CI of at least one cell tower associated with the current location information of the first vehicle 110.

At 412, determine whether the first geohash is included in the cellular network data corpus. In an embodiment, the application server 106 may be further configured to determine whether the first geohash is present in the cellular network data corpus. If, at 412, it is determined that the first geohash is present in the cellular network data corpus, then the control passes to 414. However, if, at 412, it is determined that the first geohash is not present in the cellular network data corpus, then the control passes to 422.

At 414, determine whether the first geohash is mapped to the first cell tower hash in the cellular network data corpus. In an embodiment, the application server 106 may be further configured to determine whether the first geohash is mapped to the first cell tower hash in the cellular network data corpus. If, at 414, it is determined that there exists a mapping between the first geohash and the first cell tower hash in the cellular network data corpus, then the control passes to 408. At 408, the application server 106 may be further configured to receive second location data and second telecom data from the first driver device 112 of the first driver of the first vehicle 110 and steps 410, 412, and 414 are executed. However, if, at 414, it is determined that the first geohash is not mapped to the first cell tower hash in the cellular network data corpus, then the control passes to 416.

At 416, a count of missing data is determined. In an embodiment, the application server 106 may be further configured to determine the count of missing data (such as the first count of missing data). The first count of missing data may indicate the first instance at which the mapping between the first geohash and the first cell tower hash is not present in the cellular network data corpus.

At 418, determine whether the count of missing data is greater than the first threshold value. In an embodiment, the application server 106 may be further configured to determine whether the count of missing data (such as the first count of missing data) is greater than the first threshold value. If, at 418, it is determined that the first count of missing data is not greater than the first threshold value, then the control passes to 408. At 408, the application server 106 may be further configured to periodically (for example, after a fixed interval of time duration such as 5 seconds, 10 seconds, 30 seconds, 1 minute, 2 minutes, 5 minutes, or the like) receive the subsequent location data (such as second location data, third location data, and so on) and the subsequent telecom data (such as second telecom data, third telecom data, and so on) from the first driver device 112 and steps 410, 412, 414, 416, and 418 are executed. The subsequent location data and the subsequent telecom data may be received in sequence after the first location data and the first telecom data. Further, similar to the determination of the first count of missing data, the application server 106 may be configured to determine the one or more subsequent counts of missing data based on the received subsequent location data and the received subsequent telecom data. Each subsequent count of missing data may indicate a subsequent instance at which the mapping between a corresponding geohash and a corresponding cell tower hash is not present in the cellular network data corpus. In an exemplary embodiment, the one or more subsequent counts of missing data may be determined based on the determination that the first count of missing data is less than the first threshold value. Further, the total count of missing data may be determined based on at least the first count of missing data and the one or more subsequent counts of missing data. However, if, at 418, it is determined that the first count of missing data (or the total count of missing data) is greater than the first threshold value, then the control passes to 420.

At 420, the first ride is determined as an unauthentic ride. In an embodiment, the application server 106 may be further configured to determine the first ride as the unauthentic ride, based on the determination that the first count of missing data (or the total count of missing data) is greater than the first threshold value.

At 422, determine whether the first cell tower hash has changed as compared to the previous cell tower hash. In an embodiment, the application server 106 may be further configured to determine whether the first cell tower hash has changed as compared to the previous cell tower hash. If, at 422, it is determined that the first cell tower hash has changed in comparison to the previous cell tower hash, then the control passes to 424. However, if, at 422, it is determined that the first cell tower hash has not changed in comparison to the previous cell tower hash, then the control passes to 426.

At 424, the flag corresponding to the distance travelled without change in cell towers is reset. In an embodiment, the application server 106 may be further configured to reset the flag corresponding to the variable "distance travelled without change in cell towers", based on the determination that the first cell tower hash has not changed in comparison to the previous cell tower hash. If the flag is continuously being reset for a defined number of times based on the subsequent location and telecom data, then the first ride (accepted by the first driver of the first vehicle 110) may detected as an authentic ride.

At 426, the first distance between the previous location data associated with the previous cell tower hash and the first location data associated with the first cell tower hash is determined. In an embodiment, the application server 106 may be further configured to determine the first distance between the previous location data and the first location data. The application server 106 may be further configured to update the flag corresponding to the variable "distance travelled without change in cell towers" by adding the determined first distance to the total distance travelled without change in the cell towers.

At 428, determine whether the first distance (or the total distance travelled without change in cell towers) is greater than the second threshold value. In an embodiment, the application server 106 may be further configured to determine whether the first distance (or the total distance travelled without change in cell towers) is greater than the second threshold value. If, at 428, it is determined that the first distance (or the total distance travelled without change in cell towers) is less than the second threshold value, then the control passes to 424. However, if, at 428, it is determined that the first distance (or the total distance travelled without change in cell towers) is greater than the second threshold value, then the control passes to 430.

At 430, the first ride is determined as an unauthentic ride. In an embodiment, the application server 106 may be further configured to determine the first ride as the unauthentic ride, based on the determination that the first distance (or the total distance travelled without change in cell towers) is greater than the second threshold value.

Figure 5:
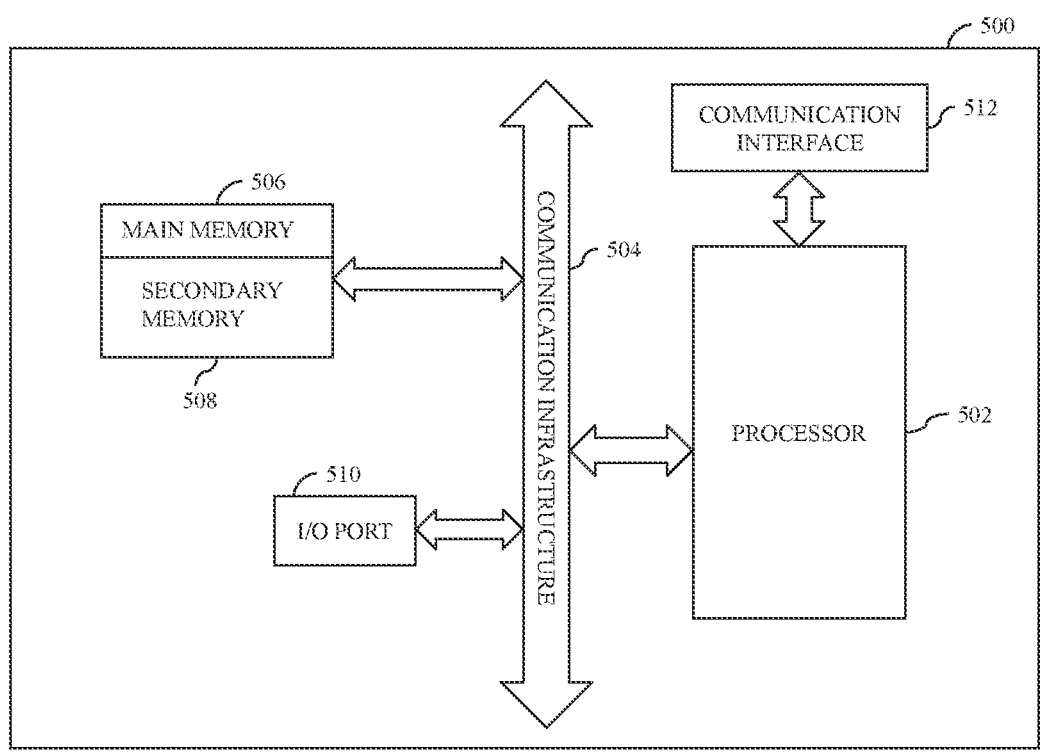
FIG. 5 is a block diagram that illustrates a system architecture of a computer system for detecting the authenticity of the ride in the vehicle allocation, in accordance with an exemplary embodiment of the disclosure.

FIG. 5 is a block diagram that illustrates a system architecture of a computer system 500 for detecting the authenticity of the first ride in the vehicle allocation, in accordance with an exemplary embodiment of the disclosure. An embodiment of the disclosure, or portions thereof, may be implemented as computer readable code on the computer system 500. In one example, the application server 106 and the database server 108 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4A-4C.

The computer system 500 may include a processor 502 that may be a special purpose or a general-purpose processing device. The processor 502 may be a single processor, multiple processors, or combinations thereof. The processor 502 may have one or more processor "cores." Further, the processor 502 may be coupled to a communication infrastructure 504, such as a bus, a bridge, a message queue, multi-core message-passing scheme, the communication network 114, or the like. The computer system 500 may further include a main memory 506 and a secondary memory 508. Examples of the main memory 506 may include RAM, ROM, and the like. The secondary memory 508 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 500 may further include an input/output (I/O) port 510 and a communication interface 512. The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may be signals, such as electronic, electromagnetic, optical, or other signals as will be apparent to a person skilled in the art. The signals may travel via a communications channel, such as the communication network 114, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 506 and the secondary memory 508 may refer to non-transitory computer readable mediums that may provide data that enables the computer system 500 to implement the methods illustrated in FIGS. 3 and 4A-4C.

Various embodiments of the disclosure provide the application server 106 for detecting the authenticity of one or more rides in real time. The application server 106 may be configured to retrieve the historical location data and the historical telecom data of the geographical region from the database server 108. The application server 106 may be further configured to determine the set of geohashes based on the retrieved historical location data and the set of cell tower hashes based on the retrieved historical telecom data. Each geohash corresponds to a unique location and each cell tower hash corresponds to a unique cell tower. The application server 106 may be further configured to generate the cellular network data corpus based on the set of geohashes and the set of cell tower hashes. The cellular network data corpus includes at least the mapping between the one or more geohashes of the set of the geohashes and the one or more cell tower hashes of the set of cell tower hashes. The application server 106 may be further configured to receive the first location data and the first telecom data from the first driver device 112 of the first driver of the first vehicle 110 based on the first ride request for the first ride accepted by the first driver. The application server 106 may be further configured to determine the first geohash based on the first location data and the first cell tower hash based on the first telecom data. The application server 106 may be further configured to detect the authenticity of the first ride based on at least the cellular network data corpus, the first geohash, and the first cell tower hash.

Various embodiments of the disclosure provide a non-transitory computer readable medium having stored thereon, computer executable instructions, which when executed by a computer, cause the computer to execute operations for detecting the authenticity of the one or more rides. The operations include retrieving, by the application server 106, the historical location data and the historical telecom data of the geographical region from the database server 108. The operations further include determining, by the application server 106, the set of geohashes based on the retrieved historical location data and the set of cell tower hashes based on the retrieved historical telecom data. Each geohash corresponds to a unique location and each cell tower hash corresponds to a unique cell tower. The operations further include generating, by the application server 106, the cellular network data corpus based on the set of geohashes and the set of cell tower hashes. The cellular network data corpus includes at least the mapping between the one or more geohashes of the set of the geohashes and the one or more cell tower hashes of the set of cell tower hashes. The operations further include receiving, by the application server 106, the first location data and the first telecom data from the first driver device 112 of the first driver of the first vehicle 110 based on the first ride request for the first ride accepted by the first driver. The operations further include determining, by the application server 106, the first geohash based on the first location data and the first cell tower hash based on the first telecom data. The operations further include detecting, by the application server 106, the authenticity of the first ride based on at least the cellular network data corpus, the first geohash, and the first cell tower hash.

The disclosed embodiments encompass numerous advantages. Exemplary advantages of the disclosed method and systems include, but are not limited to, detection of an authenticity of a ride in a ride hailing environment during the vehicle allocation process in a geographical area. The authenticity of the ride may be detected using various parameters obtained from cellular network data, location data, and historical behavior of drivers and passengers in the ride hailing environment. The system comprises exemplary core entities such as drivers, driver devices, and vehicles. All of these exemplary entities are tracked using their respective device pings. If the device pings are real, bookings are classified as real. However, if the device pings are spoofed, bookings are classified as unauthentic or fake. Thus, the implementation of the disclosed method and systems helps in determining whether the ride (accepted by a driver) is a fake ride or a genuine ride, which in turn minimizes the use of various fake GPS applications that are used by various drivers to provide falsified location updates. Further, the implementation of the disclosed method and systems helps in minimizing the fake ride counts that are generally used to gamify incentives. Further, the implementation of the disclosed method and systems helps in minimizing the fake allocation that hampers the passenger experience.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for detecting the authenticity of one or more rides in real time. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method, comprising:
   retrieving, by an application server, historical location data and historical telecom data of a geographical region from a database server, wherein each historical location data includes at least latitude and longitude information of each location of the geographical region, and wherein each historical telecom data includes at least Mobile Country Code (MCC), Mobile Network Code (MNC), Location Area Code (LAC) and Cell Identification (CI) of each cell tower of the geographical region;
   determining, by the application server, a set of geohashes based on the retrieved historical location data and a set of cell tower hashes based on the retrieved historical telecom data, wherein each geohash corresponds to a unique location and each cell tower hash corresponds to a unique cell tower;
   generating, by the application server, a cellular network data corpus based on the set of geohashes and the set of cell tower hashes, wherein the cellular network data corpus includes at least a mapping between one or more geohashes of the set of the geohashes and one or more cell tower hashes of the set of cell tower hashes;
   receiving, by the application server, first location data and first telecom data from a first driver device of a first driver of a first vehicle based on a ride request for a ride accepted by the first driver, wherein the first location data includes current latitude and longitude information of a first location of the first vehicle or the first driver device when the ride request is accepted by the first driver, and wherein the first telecom data includes at least MCC, MNC, LAC, and CI of a first cell tower associated with the first location of the first vehicle;
   determining, by the application server, a first geohash based on the first location data and a first cell tower hash based on the first telecom data; and
   detecting, by the application server, an authenticity of the ride based on at least the cellular network data corpus, the first geohash, and the first cell tower hash.

2. The method of claim 1, further comprising determining, by the application server, whether the first geohash is included in the cellular network data corpus.

3. The method of claim 2, further comprising determining, by the application server, whether the first geohash is mapped to the first cell tower hash in the cellular network data corpus, based on the determination that the first geohash is included in the cellular network data corpus.

4. The method of claim 3, further comprising determining, by the application server, a first count of missing data, based on the determination that the first geohash is not mapped to the first cell tower hash in the cellular network data corpus.

5. The method of claim 4, further comprising receiving, periodically, by the application server, subsequent location data and subsequent telecom data from the first driver device to determine one or more subsequent counts of missing data, wherein the subsequent location data and the subsequent telecom data are received based on a determination that the first count of missing data is less than a first threshold value, and wherein a total count of missing data is determined based on at least the first count of missing data and the one or more subsequent counts of missing data.

6. The method of claim 5, further comprising determining, by the application server, the ride as an unauthentic ride, based on a determination that the total count of missing data is greater than the first threshold value.

7. The method of claim 2, further comprising determining, by the application server, whether the first cell tower hash has changed as compared to a previous cell tower hash, based on the determination that the first geohash is not included in the cellular network data corpus.

8. The method of claim 7, further comprising resetting, by the application server, a flag corresponding to a distance travelled without change in cell towers, based on the determination that the first cell tower hash has changed as compared to the previous cell tower hash.

9. The method of claim 7, further comprising determining, by the application server, a distance between a previous location data associated with the previous cell tower hash and the first location data associated with the first cell tower hash, wherein the distance is determined based on the determination that the first cell tower hash has not changed as compared to the previous cell tower hash.

10. The method of claim 9, further comprising determining, by the application server, the ride as an unauthentic ride, based on a determination that the distance is greater than a second threshold value.

11. A method, comprising:
   receiving, by an application server, first location data and first telecom data from a first driver device of a first driver of a first vehicle based on a ride request for a ride accepted by the first driver, wherein the first location data includes current latitude and longitude information of a first location of the first vehicle or the first driver device when the ride request is accepted by the first driver, and wherein the first telecom data includes at least Mobile Country Code (MCC), Mobile Network Code (MNC), Location Area Code (LAC) and Cell Identification (CI) of a first cell tower associated with the first location of the first vehicle;

determining, by the application server, a first geohash based on the first location data and a first cell tower hash based on the first telecom data; and detecting, by the application server, an authenticity of the ride based on at least the first geohash, the first cell tower hash, and a cellular network data corpus, wherein the cellular network data corpus includes at least a mapping between one or more geohashes of one or more locations in a geographical region and one or more cell tower hashes of one or more cell towers in the geographical region.

12. An application server comprising:
a memory storing instructions; and
one or more processors that execute to:
retrieve, from a database communicatively coupled to the application server via a communication network, historical location data and historical telecom data of a geographical region;

determine a set of geohashes based on the retrieved historical location data and a set of cell tower hashes based on the retrieved historical telecom data, wherein each geohash corresponds to a unique location and each cell tower hash corresponds to a unique cell tower;

generate a cellular network data corpus based on the set of geohashes and the set of cell tower hashes, wherein the cellular network data corpus includes at least a mapping between one or more geohashes of the set of the geohashes and one or more cell tower hashes of the set of cell tower hashes;

receive first location data and first telecom data from a first driver device of a first driver of a first vehicle based on a ride request for a ride accepted by the first driver, wherein the first location data includes current latitude and longitude information of a first location of the first vehicle or the first driver device when the ride request is accepted by the first driver, and wherein the first telecom data includes at least Mobile Country Code (MCC), Mobile Network Code (MNC), Location Area Code (LAC) and Cell Identification (CI) of a first cell tower associated with the first location of the first vehicle;

determine a first geohash based on the first location data and a first cell tower hash based on the first telecom data; and detect an authenticity of the ride based on at least the cellular network data corpus, the first geohash, and the first cell tower hash.

13. The application server of claim 12, wherein the application server is further configured to determine whether the first geohash is included in the cellular network data corpus.

14. The application server of claim 13, wherein the application server is further configured to determine whether the first geohash is mapped to the first cell tower hash in the cellular network data corpus, based on the determination that the first geohash is included in the cellular network data corpus.

15. The application server of claim 14, wherein the application server is further configured to determine a first count of missing data, based on the determination that the first geohash is not mapped to the first cell tower hash in the cellular network data corpus.

16. The application server of claim 15, wherein the application server is further configured to receive, periodically, subsequent location data and subsequent telecom data from the first driver device to determine one or more subsequent counts of missing data, wherein the subsequent location data and the subsequent telecom data are received based on a determination that the first count of missing data is less than a first threshold value, and wherein a total count of missing data is determined based on at least the first count of missing data and the one or more subsequent counts of missing data.

17. The application server of claim 16, wherein the application server is further configured to determine the ride as an unauthentic ride, based on a determination that the total count of missing data is greater than the first threshold value.

18. The application server of claim 12, wherein the application server is further configured to determine whether the first cell tower hash has changed as compared to a previous cell tower hash, based on the determination that the first geohash is not included in the cellular network data corpus.

19. The application server of claim 18, wherein the application server is further configured to reset a flag that corresponds to a distance travelled without change in cell towers, based on the determination that the first cell tower hash has changed as compared to the previous cell tower hash.

20. The application server of claim 19, wherein the application server is further configured to:
determine a distance between a previous location data associated with the previous cell tower hash and the first location data associated with the first cell tower hash, wherein the distance is determined based on the determination that the first cell tower hash has not changed as compared to the previous cell tower hash; and
determine the ride as an unauthentic ride, based on a determination that the distance is greater than a second threshold value.

* * * * *